Patented Apr. 7, 1936

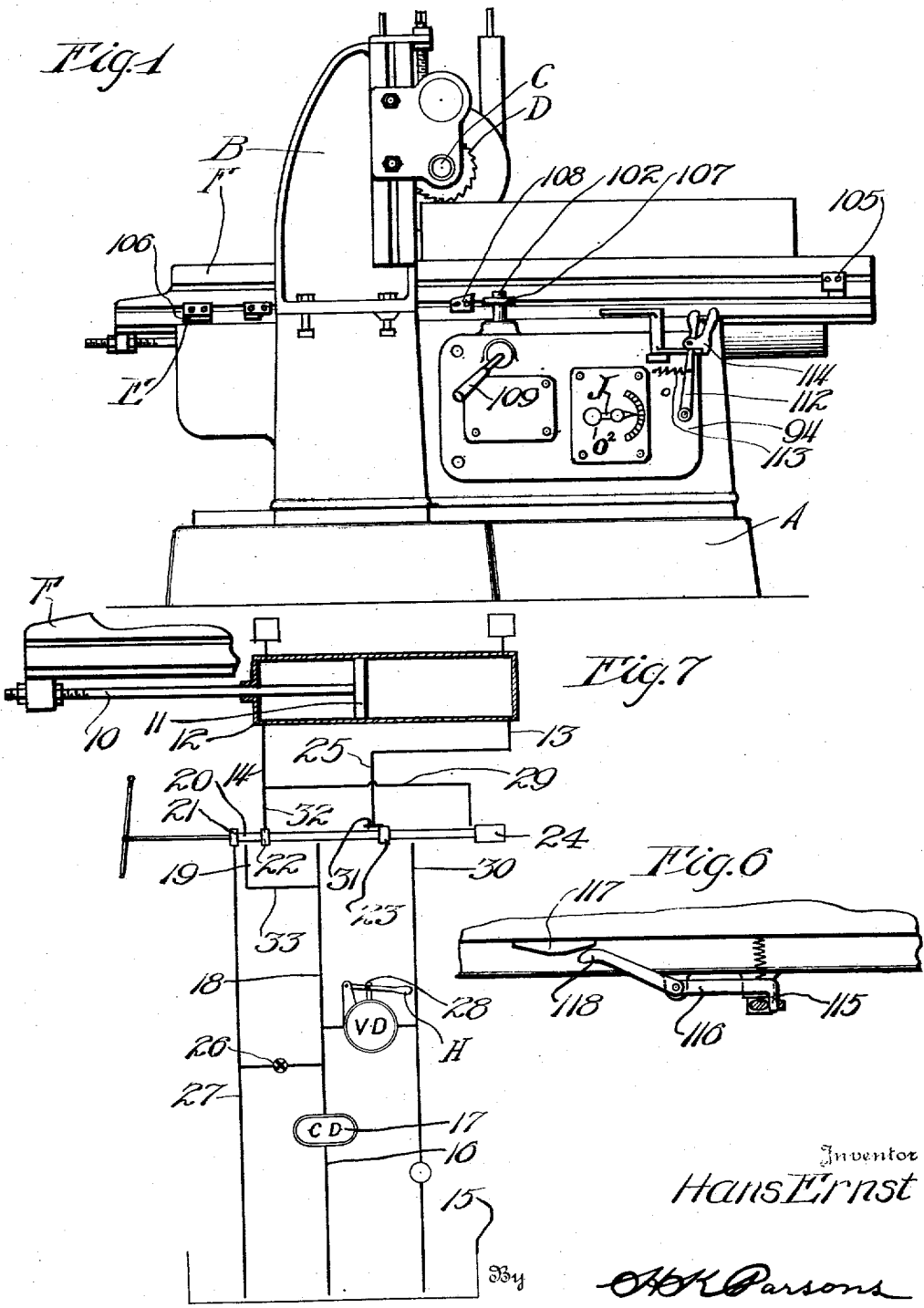
April 7, 1936.  H. ERNST  2,036,206
MACHINE TOOL
Filed Aug. 9, 1926  4 Sheets-Sheet 1
Inventor
Hans Ernst
By A. K. Parsons
Attorney

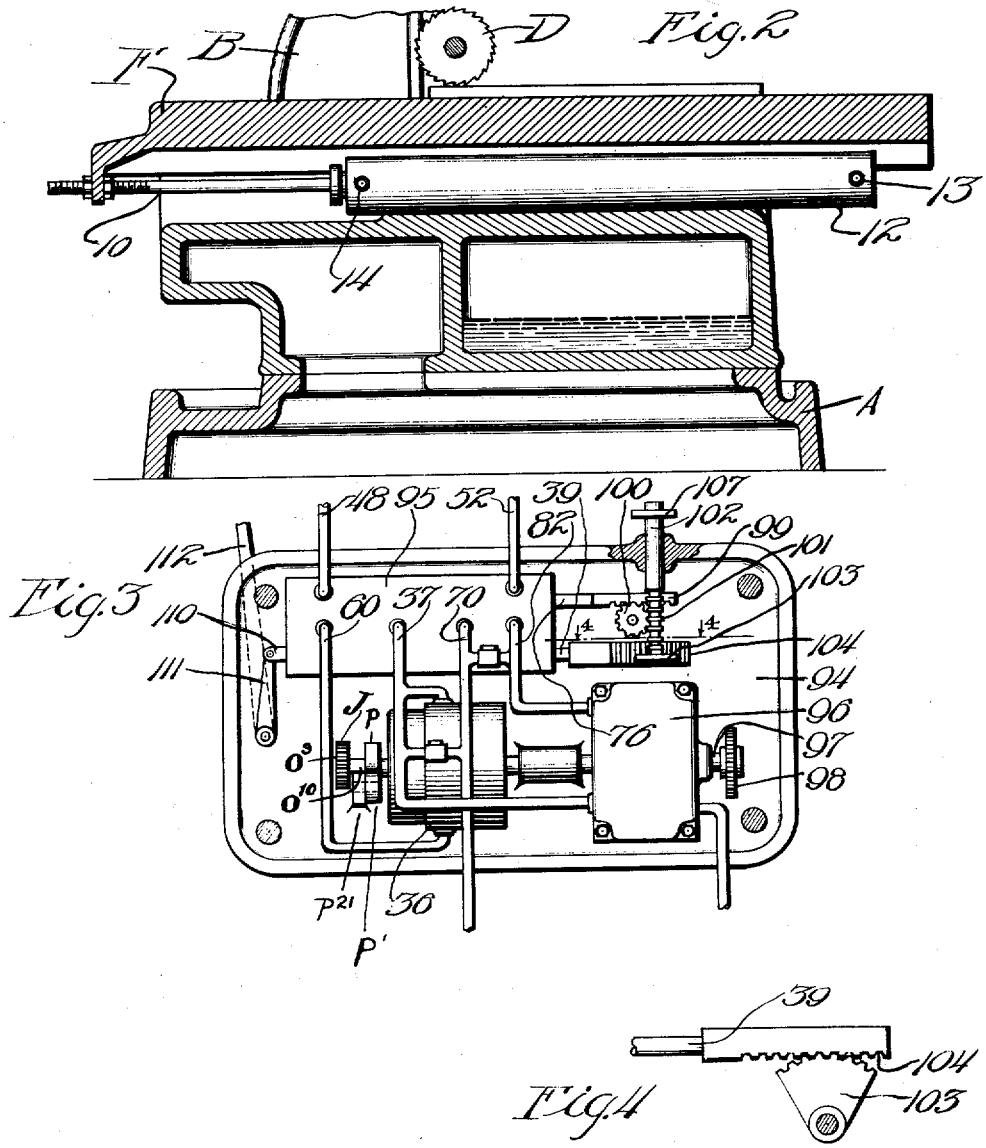
April 7, 1936. H. ERNST 2,036,206
MACHINE TOOL
Filed Aug. 9, 1926 4 Sheets-Sheet 2
Inventor
Hans Ernst
By H. K. Parsons
Attorney

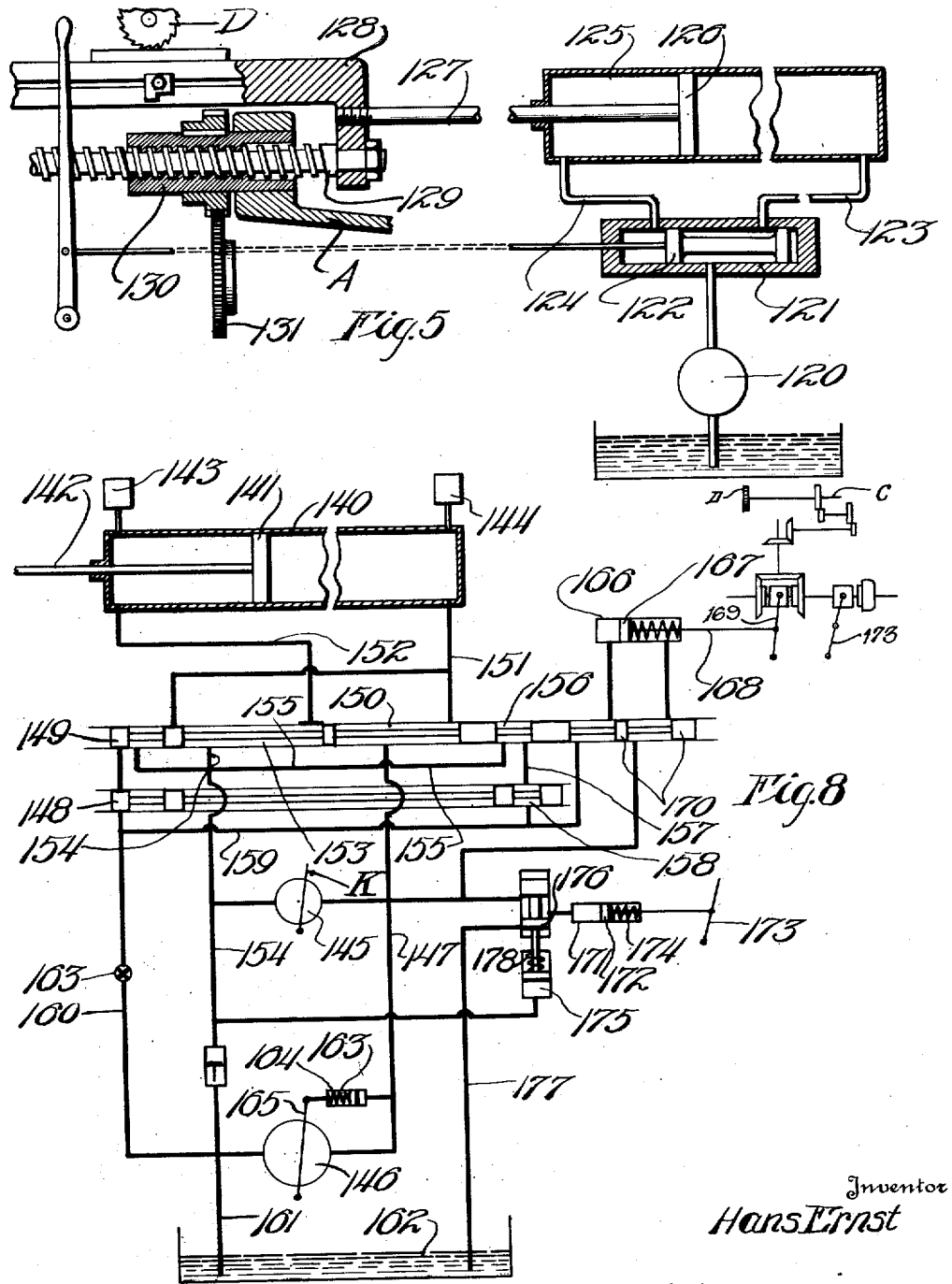

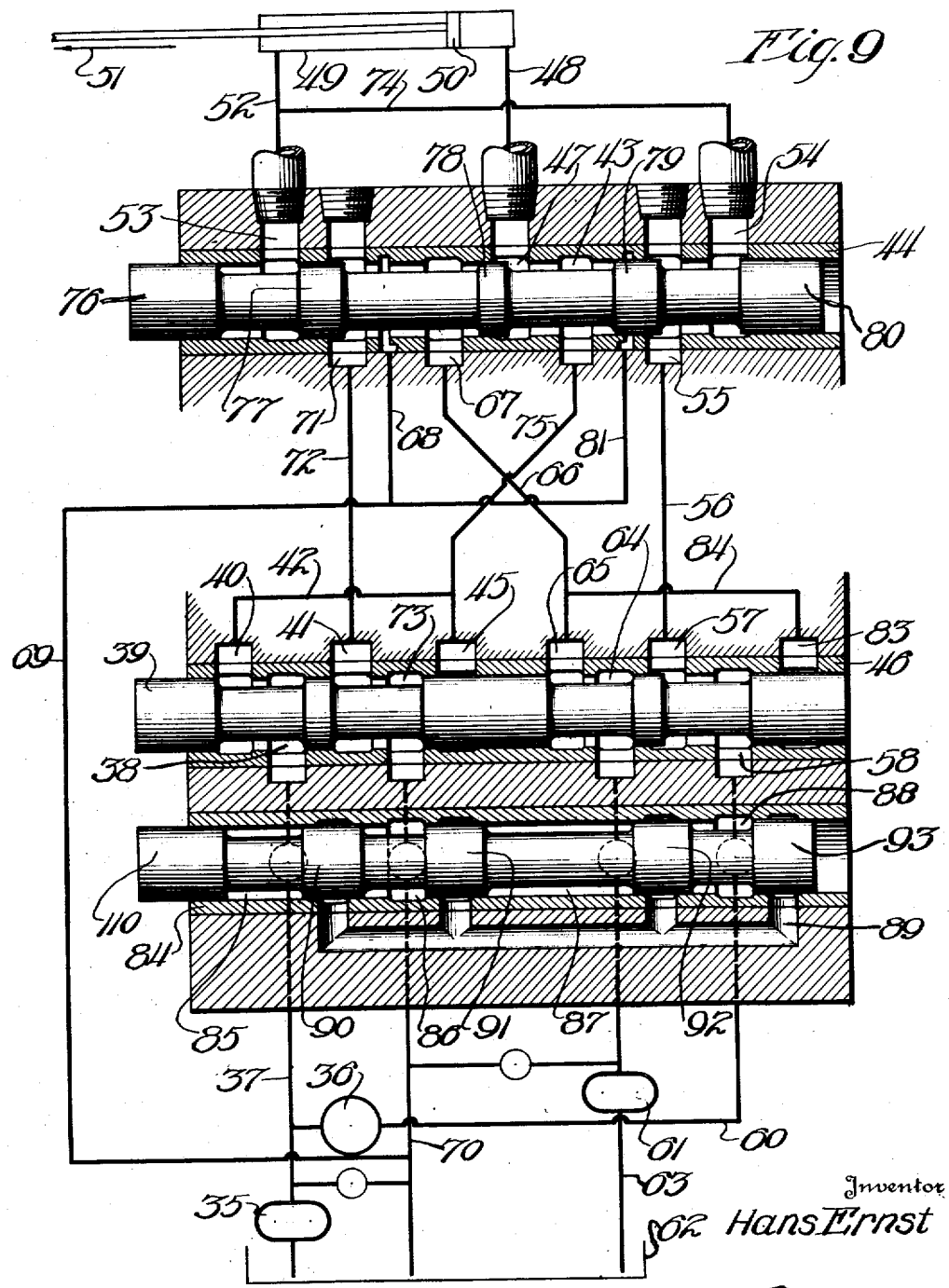

2,036,206

UNITED STATES PATENT OFFICE 2,036,206

MACHINE TOOL

Hans Ernst, Cincinnati, Ohio, assignor to The Cincinnati Milling Machine Company, Cincinnati, Ohio, a corporation of Ohio Application August 9, 1926, Serial No. 128,167

42 Claims. (Cl. 90—21.5)

This invention relates to improvements in machine tools and has particular reference to the mechanism for controlling relative movement of the work and tool in milling machines, grinders or like devices.

In the operation of various types of machine tools, it is desirable that the idle time of the machine be reduced to a minimum. This may be accomplished by imparting a relatively fast movement to the work and tool prior to engagement of these parts followed by a slow feeding movement during the actual cutting operation and a subsequent acceleration in either forward or reverse direction on completion of the cutter until the work is in a position to be removed from the machine or a new cut made.

During the actual cutting action difficulty has been experienced with mechanisms employed in the past, due to the play or back lash causing an irregular feeding movement in that in some instances the grip of the tool on the work will have an accelerating effect and in others a decelerating effect. Also, when it is desired to move the work in the same direction as the cutting tool in the case of a milling machine for example, in the interval between maximum cut engagement between the individual cutter teeth and the work with a slow rotating cutter, there is a tendency toward a jerky feeding movement.

It is therefore one of the objects of the present invention to obviate the several difficulties experienced in obtaining proper feed and travel of the parts in prior art structures and to substitute a mechanism which will insure a substantially positive and continuous rate of travel at either rapid or feeding speeds, and for movement of the work both with and against the direction of movement of the tool.

A further object of the invention is the provision of an improved mechanism which shall possess a slight cushioning effect, permitting of yielding under undue strain conditions without the tendency of binding or breakage of the parts or establishment of vibration and chatter in the machine.

An additional object of the present invention is the provision of a novel and improved hydraulic or fluid means for insuring the feeding action in a machine tool structure in combination with novel mechanism for controlling the rate of progress produced by said hydraulic mechanism.

Other objects and advantages of the present invention should be readily apparent by reference to the following specification taken in connection with the accompanying drawings, and it will be understood that I may make any modifications in the specific structural details hereinafter described or disclosed in the accompanying drawings within the scope of the appended claims, without departing from or exceeding the spirit of the invention.

Figure 1 is a side view of a machine constructed in accordance with and embodying the principles of my invention.

Figure 2 is a fragmentary longitudinal sectional view showing the table control cylinder and connections therefrom.

Figure 3 is a view of the control plate removed, showing the several parts associated therewith.

Figure 4 is a sectional view on the line 4—4 of Figure 3.

Figure 5 is a sectional view of a modified form of structure making use of combined hydraulic and mechanical control means for the work table.

Figure 6 is a fragmentary plan view showing detail of the automatic stop.

Figure 7 is a diagrammatic view illustrating a simple form of machine control circuit.

Figure 8 is a similar diagrammatic view of a more complete machine control arrangement, and Figure 9 is a diagrammatic view of the control system as an entirety, the control valve plungers being shown in sections to facilitate an understanding of the interconnections of the several portions of the control system by shifting of the valves.

In the drawings the control mechanism as aforesaid has been shown as applied to an automatic milling machine. This machine includes the bed A having rising therefrom the upright columns B, bearing the spindle C for the cutter D. The bed is further provided with ways E for the reciprocable table F.

Secured to the table F is the piston rod 10, coupled with piston 11 in the elongated cylinder 12 contained in the bed A of the machine. This cylinder 12 is provided near its ends with the pipe connections 13 and 14 adapted to receive fluid under pressure for hydraulic actuation of the piston. The general principles of operation of the structure will probably be best understood by reference to diagrammatic view Figure 7, from which it will be seen that there is provided a suitable fluid reservoir 15 having leading therefrom the suction line 16 to the high pressure pump 17 which in Figure 7 is diagrammatically indicated as a constant discharge pump, discharging the fluid under predetermined pressure through line 18 to the general valve casing 19. Within this casing is the sliding valve rod 20, bearing the valve piston portions 21, 22, 23 and 24, respectively. With the parts in the position shown, pipe 18 will communicate through the piston chamber with the pressure pipe 25 terminating in the inlet 13 at one end of cylinder 12. When so coupled there will be a constant head of pressure built up within the cylinder 12 by the constant delivery high pressure pump above referred to, urging the piston toward the left. An automatic pressure release valve as at 26 permits of flow of the fluid under pressure, back through pipe 27 to reservoir 15 in the event the pressure built up by said pump is in excess of the predetermined desired amount.

It will be understood the pressure thus built up by the constant delivery pump is sufficiently great to overcome all friction of the table and all resistance imparted by the cutter, in the event that the work be traveling against the cut pressure thereof, and to advance the work at a desired rate.

To control the rate of advance of the piston and thus of the work table associated therewith, use is made of the variable discharge pump 28. Such pumps per se require no detailed description for they are available as standard equipment in numerous forms and likewise have heretofore been utilized by makers of various types of machine-tools for the purpose of obtaining a variety of selectively available feeds in lieu of purely mechanical feed-change gear-sets. It suffices to mention that all such "variable discharge" pumps, as they are commonly termed, embody manual means for conveniently adjusting them to pass fluid at any one of a range of "feeds", just as feed-changes likewise are provided with a conveniently located hand-lever for their manipulation. As illustrative of this common practice, reference may however be made, among others, to the U. S. patent to Townsend, 1,338,265 and those to Ferris numbered 1,558,002; 1,619,-200; 1,647,690; 1,690,069 and 1,741,833.

Manual means for thus adjusting the variable discharge pump are herein represented diagrammatically by the hand-lever H for the variable discharge pump 28 of Fig. 7 and by the hand-lever K for the variable-discharge pump 145 of Fig. 8. The corresponding means is represented structurally in part by J on Fig. 3. It will, of course, be understood that the hand-lever itself will be located outside of the main valve chest 95 and the connection will extend through the cover plate 94 and terminate in the hand-lever at the front side thereof where accessible to the user of the machine.

The manual adjusting means indicated generally by J on Figs. 1 and 3 follows the conventional arrangement illustrated, for example, by the patent to Ferris No. 1,619,200, in which a rotation of a conveniently located hand lever adjusts the throw or eccentricity of the pump to regulate its delivery. Thus, the hand-lever $O^2$ shown on Fig. 1 is, through ordinary gearing, connected to rotate the gear $O^9$ on the inside of the cover plate 94 and through that gear $O^9$ and the shaft $O^{10}$ is thus able to turn the usual cam P into the desired angular position. That cam P bears against a fixed abutment which, to relieve friction is customarily made in the form of a roller $P^1$ carried by a fixed lug $P^{21}$. The axis of the cam is thereby shifted in greater or less off-set relation to the central axis of the pump which is conventionally so organized that its output is thereby regulated.

Unlike conventional systems, however, this variable discharge pump is so disposed and combined in the present system that it does not operate to actuate the movement of the table, but on the contrary operates only as a relief of pressure on the left hand side of the piston, so that the parts may advance to the extent thus permitted. This has the advantage over use of a variable discharge pump to build up the pressure, in that the actuating pressure under this system is constant and continuous and invariable in its operation, insuring a continuous working force, while the variable flow pump having only to resist the movement or flow of the fluid is not open to the liability of fluctuating movement present when it is itself the direct actuator. In the mechanism as shown in Figure 7, the pressure at the right of piston 11 urges it against the fluid contained in the left end of cylinder 12, this fluid then tending to flow out through pipe 14 and thence through the pipe or conduit 29 and the space in the valve chamber between the piston valves 23 and 24 to pipe or conduit 30 and thence into pump 28. From pump 28 the fluid may be returned to the reservoir 15, but preferably it will be exhausted into pressure pipe 18 thus assisting in maintaining the pressure in this pipe and increasing the volume of fluid tended to be discharged there-through, thus making it possible to utilize a constant discharge pressure-boosting pump of less volume capacity than would be required should the variable discharge pump connect direct with the reservoir.

If the valve plunger rod 20 be given a partial movement to the left, the pressure from line 18 may then pass direct through coupling 31 back to variable discharge pump 28, and at the same time will act equally through pipes 32 and 25 on opposite ends of the piston and movement in either direction will be checked. At the same time the pressure may also flow through pipes 33 and 27 back to the reservoir.

Further movement of the valve rod with its various piston valves to the left will cause valve 22 to close the upper end of pipe 33 and valve 23 to shut off a communication from line 18 to pipe 25, when the pressure will flow through pipe 18 and pipe 32 and through pipe 14 into the left hand end of the cylinder. At the same time the right hand end of the cylinder will be connected through 13, 25, and 31, with pipe 30 and thence to the inlet side of variable discharge pump 28 when the table will be shifted in the reverse direction.

It will be noted that the control mechanism just described accomplishes a feeding movement of the table in either direction, coupled with a stopping action.

In the event that it is desired to make use of variable speeds, such as rapid traverse and feeding rates of movement in one or both directions, use is made of the mechanism shown in Figure 9. In this form of the invention a constant discharge high pressure pump 35 and a variable discharge pump 36 jointly supply pressure to line 37 in communication with valve chamber 38. Depending on the position of the control valve rod 39, this discharge may pass from chamber 38 into chamber 40 or chamber 41. When passing into chamber 40 it moves through line 42 into the chamber 43 of valve casing 44. When moving through line 42 into chamber 43 with the several valves in the position shown in Figure 9, the pressure then moves through chamber 47 and pipe 48 into one end of cylinder 49, actuating the piston 50 in the direction indicated by arrow 51. At the same time the opposite end of the cylinder is connected by line 52 with chamber 53 and chamber 54. Chamber 53 being blanked off by the valve position, the flow will be through chambers 54 and 55 and line 56, chambers 57 and 58 and line 60 to the inlet or receiving side of the variable discharge pump 36. The progress of the piston is in this event limited by the discharge flow through pump 36 as has been described in connection with the previous embodiment of the invention.

This pump 36 in this arrangement, acts as a "meter" to regulate the rate of the discharge from the back-pressure line. Such discharge is, therefore, in the nature of a metered escapement and depends entirely upon the adjustment of the variable delivery pump.

It will be understood that in machine tool operation such as milling for example, it is desirable for the work to be slowly moved past the tool during the cutting stroke and then rapidly returned to its initial loading position. To facilitate accomplishment of this result, use is made of a second constant discharge pump 61 which discharges idly during the feeding stroke. This pump lifts the fluid from reservoir 62 through line 63, whence it passes upward through line 82, chambers 64, 65 and line 66 to chamber 67, thence it flows through relief line 68, and 69 back to reservoir discharging pipe 70. It also flows from chamber 67 through chamber 71 and line 72, thence to chamber 41 and through chamber 73 into discharge pipe 70, being therefore ineffective under these conditions. However, if valve 39 be shifted to the right closing off chambers 38—40, 41—73, 64—65 and 57—58, the flow will then be from pump 61 through 64—57—56—55—54—74 to the left hand end of the cylinder, tending to reversely shift the piston at a rapid rate, due to the volume of discharge from pump 61. At the same time the right hand end of the cylinder will be coupled through line 48—47—43—75—45—73—70 with the reservoir, so that there is no pressure resistance to the rapid rate movement of the table.

In order that it may be possible to also move the work in toward the cutter at a rapid rate of speed and then check its speed of movement to the proper feeding rate, use is made of the second valve plunger rod 76 movable in the casing 44. This valve with its component piston valve portions 77, 78, 79 and 80 controls the rate only of movement of the parts in the position shown in Figure 9. With the valve rod 39 set as shown the fluid pressure circuits as described cause a slow feeding movement of the parts toward the left. However, if valve plunger 76 be shifted to the right the feed pressure circuit through chambers 43 and 47 and line 48 will be shut off by piston valve 78, this circuit then being shorted or returned to the reservoir as through return lead 81. At the same time the high volume constant pressure pump line 82 will be coupled through 64 and 65, 66, 67, 47 and 48 with the cylinder, causing the rapid movement of the work toward the cutter to the indexed point when shifting of plunger valve rod 76 to the left will return the parts to position shown in Figure 9, and cause a feeding movement. Likewise, if the valve 39 be at the right as previously described, causing a quick withdrawing movement of the work, and the valve plunger rod 76 be shifted to the right, the piston portion 79 will cut off the rapid traverse flow through 55—54 which will then be shorted back to the reservoir through lines 81 and 75, while the pressure for slow return feeding movement will be applied through 37, 38, 41, 72, 71, 53, 52. At the same time the variable pressure pump inlet or receiving line will be coupled through 60, 58, 83, 84, 66, 67, 47, 48, with the opposite end of the cylinder and piston thus controlling the rate of movement thereof. From the foregoing it will be seen that the valve member 39 may be set to give either a forward feed or a return movement and that for a given setting of the valve member 76 the one of these will be rapid and the other slow, but that by changing the setting of the member 76 the slow movement may be changed to rapid or the rapid movement to slow. Variation of the member 76, however, will serve only to vary the rate of movement of the work member while variation in position of the member 39 serves at the time to vary both rate and direction. This latter is particularly advantageous as it permits of a single shifting movement varying the operation of the machine from a slow feed in the one direction to a rapid rate in the opposite direction, this being the prime desirable movement of the parts and being particularly facilitated by the valving here employed.

While it is possible to so construct the valves just referred to that in an intermediate position they will stop all movement of the work and work table as by producing balanced pressure condition, I have found in actual practice it is more desirable to provide a separate stop mechanism, so that the table movement may be checked at any desired point without change in the operative setting of the several valve members at that particular moment. For the accomplishment of this result therefore, use may be made of a second or supplemental valve bushing 84, having chambers 85, 86, 87 and 88 respectively in communication with the several pressure and relief lines 37, 70, 82 and 60. Adjacent and in communication with these chambers is the common conduit 89 having ports adapted to open into the several chambers being normally closed by the piston valve portions 90, 91, 92 and 93 on the valve member 110. Movement of this member as to the right will serve to open up the several ports throwing the various lines into communication one with the other and producing therefore a perfectly balanced pressure condition, so that there is no actuation of the table thereby in either direction. Similarly, a reverse movement of the valve will close the several outlets and cause the machine to resume its normal operation.

One mechanical mechanism for control of the valve devices, etc. just referred to is shown on sheets 1 and 2 of the drawings. Carried by the bed A of the machine is the cover plate 94 which carries the main valve chest 95 having extending therefrom the final pressure pipes 48 and 52 and having leading thereinto the pressure lines 37 and 82 and leading therefrom the return lines 60 and 70. The two constant pressure pumps 35 and 61 are contained within a suitable joint housing 96, while the variable pressure pump is disposed at 36. A common shaft 97 driven as from pinion 98 operates these several pumps. Valve rod 76 has coupled therewith rack member 99 meshing with pinion 100 which in turn meshes with the annular threads 101 on the rotatable axially shiftable plunger 102. This plunger is also provided with the circular rack portion or segment 103, meshing with rack 104 in turn coupled with valve slide rod 39. As a result of these connections oscillation of plunger 102 serves to actuate valve 39. This oscillation may be effected by engagement between conventional control dogs 105 and 106 on the edge of the table F with the respective sides of wing-head 107 of the plunger. Similarly, the vertical movement for changing from quick traverse to feed may be effected as by a conventional cam dog 108 on the table, engaging and lifting or axially shifting plunger 102.

In addition, a universally movable handle 109 is pivoted to the plate 94 and may be suitably related with plunger 102 as by a tongue and socket connection for example, so as to impart motion to the plunger or conversely to be moved with the plunger, so that the handle indicates the position of the valve and may be selectively shifted to rotate or axially move the control plunger and thus impart desired shifting movement or movements to the two valves.

To take care of the feature of starting and stopping the table movement or in other words, operation of the stop valve plunger 110, this valve may be coupled with the rock arm 111, movable in unison with handle 112 and urged to stopping position as by spring 113. Pivoted keeper handle 114 on the lever 112 by interlocking engagement with lug 115 on lever arm 116 serves normally to hold the valve in open position against the urge of spring 113. However, the table may be provided with a stop dog 117 adapted to contact with end 118 of the lever 116, rocking it about its pivot to withdraw lug 115 from engagement with keeper 114 and allow the valve to snap over and stop movement of the table in the manner previously described.

Sheet three of the drawings illustrates certain possible modifications falling within the scope of the present invention. For example, Figure 5 illustrates the use of a constant discharge pump 120 emptying into a valve fixture 121 having a control valve 122 for selectively directing pressure through either pipe line 123 or line 124 into the opposite ends of the cylinder 125. This cylinder contains piston 126 coupled by piston rod 127 with the table 128. To resist movement of the table as directed by pressure for instance in the right hand end of cylinder 125, use is made of the hold back screw 129 carried by the table and passing through nut 130. This nut is swivelled to the bed A and rotation is imparted to it as by gear 131. The thread or screw 129 is a loose fit in nut 130 with the result that actuating pressure forces the screw constantly longitudinally in the nut in the direction indicated by arrow, so that the screw has no feeding or advancing action on the table, but exerts purely a retarding action mechanically limiting the rate of progress of the table as imparted by the fluid pressure.

Figure 8 illustrates an arrangement particularly adapted for use when it is desired to use a single pressure producing member or series of such members for actuation not only of the relative movement of work and cutting tool in the machine, but also for actuation for certain auxiliary mechanisms whereby there may be an appreciable momentary difference in the volume of liquid contained in the machine. In the embodiment here diagrammatically illustrated use is made of the piston cylinder 140 containing piston 141 coupled by rod 142 with the part of the machine to be shifted. Gages are shown at 143 and 144 for indicating the pressure existent at the moment in that portion of the system. The actuating pressure for movement of piston 141 is jointly produced by variable discharge pump 145 and a second variable discharge pump 146, the latter being adjusted to maintain a constant pressure in the line 147 and being unaffected by the relief pressure in the cylinder which is controlled as in the forms previously described by the variable discharge pump 145. The valve is substantially the same as that described in detail in connection with Figure 9 and it is therefore believed unnecessary to specifically here describe the shifting of the speed changing valve rod 148 and its associated valve pistons or of the combined speed and direction varying valve 149, these corresponding respectively to the valve rods 76 and 39 of Figure 9. It will merely be briefly mentioned that in the position of the parts as shown, pressure is maintained in the line 147 and thence through chamber 150 and line 151 to the right hand end of cylinder 140. The line controlling the rate it will be understood for feeding connects through pipe 152 and chamber 153 with line 154. It may then pass in part back through pump 145 which normally receives all of this discharge, but in the attaining of rapid traverse as here indicated, a portion of the flow is through pipe 155, chamber 156, pipe 157, chamber 158 and line 159, 160, and 161 to either the main actuating pump 146 or reservoir 162. A check valve 163 serves to maintain a low pressure, as for example, a five pound pressure within the line, so that there will be proper flow to pump 145. One of the important distinctions in this system is that in place of employing a constant discharge pump for maintaining pressure against the piston for actuation thereof and a relief valve for excess pressure flow, use is made of a variable discharge pump in connection with an automatic pressure maintaining mechanism comprising the cylinder 163 coupled with the pressure line 147 to actuate the piston toward the left tending to reduce the discharge of pump 146 as pressure piles up in line 147. Conversely as the pressure drops in the pressure side 147, expansion of spring 164 shifts the control arm 165 of the variable discharge pump to produce a greater flow therefrom thus maintaining the quantity of fluid in the line at a constant pressure. It will be understood that suitable means may be provided for varying the tension of spring according to the pressure desired to maintain. This mechanism is particularly advantageous as through its use it is possible to employ auxiliary direct shifted mechanism such as the auxiliary cylinder 166 containing piston 167, whose rod 168 is connected with the spindle reversing mechanism 169. Suitable control valve portions 170 coupled with the valve rod 149 of the combined reverse and speed controlling valve mechanism regulate the flow of pressure into cylinder 166 so that the spindle will be automatically reversed in timed relation to the reversal of relative movement of the work and cutter. Also, a second auxiliary cylinder 171 may be employed having a piston 172 coupled with the spindle stop 173. So long as pressure is maintained in line 147 this pressure will be communicated to cylinder 171 and hold the spindle engaging lever in driving position. If for any reason this pressure drops, expansion of spring 174 will shift mechanism 173 to stop rotation of the spindle. Also, if there is an undue reduction of back pressure for any reason in the line 154, this reduction of pressure will operate in cylinder 175 and allow expansion of spring 178 to shift valve 176, cutting off this pressure from the spindle engaging lever cylinder 171 and coupling this cylinder through line 177 with the reservoir, thus again relieving the pressure and allowing the lever to shift to a non-operative position. As will be understood, on account of the automatic control of volume of discharge from pump 146 these several mechanisms may all be coupled with the pressure line for actuation therefrom and the automatic compensating feature will maintain the same pressure substantially constant in the line irrespective of the variation in volume of content of the line on account of the presence of such auxiliary mechanisms.

From the foregoing description taken in connection with the drawings, it is believed both the broadly novel principles and the specific mechanical embodiment chosen for purpose of illustration and explanation thereof, should be readily understood and it will be seen that I provide a novel and efficient control for relative movement of work and work piece in a machine tool, in which the movement in the direction of cut is attained by employment of a constant and uniform pressure considerably in excess of that which is necessary to overcome the normal resisting forces of friction cut pressure and the like and in which this movement is properly variably resisted to allow a controlled shifting under the influence of the pressure at desired predetermined rate.

I claim:

1. In a machine tool the combination with a reciprocating member, of control means therefore, including a pressure cylinder, a piston centrally movable in the cylinder, means for directing constant pressure into the cylinder to positively actuate the piston in one direction, a pump for variably relieving the pressure on the opposite side of the piston to control the rate of movement thereof, and means for reversing the connections of the constant and variable pressures to reverse the direction of both movements of the piston.

2. In a machine tool the combination with a reciprocating member, of control means therefore, including a pressure cylinder, a piston centrally movable in the cylinder, means for directing constant pressure into the cylinder to positively actuate the piston in one direction, a pump for positively controlling the volume of discharge of the cylinder to control the rate of movement thereof, and additional means for rapidly relieving the pressure at one side of the piston to facilitate quick traverse movement thereof.

3. An hydraulically controlled machine tool having a movable member including a piston coupled with said member, a control cylinder for the piston, having ports at its ends for controlling pressure on opposite sides of the piston, a plurality of pressure producing mechanisms including a variable delivery pump, a common pressure line receiving the flow from said mechanisms, means for selectively coupling said pressure line with either end of the cylinder and means connected to restrict and receive the discharge from said cylinder and adapted positively to regulate the volume of said discharge thereby to determine the rate of advance of said piston.

4. An hydraulically controlled machine tool having a movable member including a piston coupled with said member, a control cylinder for the piston, having ports at its ends for controlling pressures on opposite sides of the piston, a plurality of pressure producing mechanisms including a variable delivery pump, a common pressure line receiving the flow from said mechanisms, means for selectively coupling said pressure line with either end of the cylinder, a low pressure release line, a controlled pressure release line, and means for selectively coupling said release lines with the opposite end of the cylinder to vary the resistance to movement of the piston in the cylinder.

5. A machine tool assembly, including work support and a tool support, one of said parts being movable with respect to the other, hydraulic means including a cylinder and a piston intermediately movable in the cylinder, said piston being coupled with the movable part for actuation thereof, auxiliary cylinder and piston mechanism for controlling the direction of rotation of the tool, a fluid pressure pump couplable with the main and supplemental cylinders for actuation thereof, and valve mechanisms controlling the coupling of the parts with the pressure pump.

6. A machine tool assembly, including work support and a tool support, one of said parts being movable with respect to the other, hydraulic means including a cylinder and a piston intermediately movable in the cylinder, said piston being coupled with the movable part for actuation thereof, auxiliary cylinder and piston mechanism for controlling the direction of rotation of the tool, a fluid pressure pump couplable with the main and supplemental cylinders for actuation thereof, valve mechanisms controlling the coupling of the parts with the pressure pump and means for automatically shifting certain of the valves to control the actuating pressures.

7. An hydraulically controlled machine tool, having a reciprocating element, a piston couplable with said element, a cylinder for the piston, having ports at its ends, means for supplying a variable volume of constant pressure through one of said ports to one end of the cylinder, additional variable means for maintaining pressure at the opposite end of the cylinder while releasing the discharge therefrom at a volumetrically controlled rate, valves controlling the selective coupling of said pressure mechanisms with the cylinder and automatic means operated by the shifting of the movable element of the machine for varying the position of the valves.

8. An hydraulically controlled machine tool of the character described, including a reciprocable table, an actuating piston therefor, hydraulic means for shifting the piston and table in either direction at either a slow or rapid rate, a plurality of valves for controlling the rate and direction of movement of the table, a single trip member coupled with the valves for selective actuation thereof, and dogs on the table cooperating with the trip member for controlling the shifting of the valves and thus the rate and direction of movement of the table.

9. A machine tool combining a work support and a tool support; three constantly driven pumps, one being a large capacity low pressure pump, another being a small capacity high pressure pump, and the third being a variable escapement pump; hydraulically actuated means for propelling one of said supports; and a valve system intervening between said means and said three pumps for accomplishing a rapid traverse by utilizing only the first mentioned pump, or for accomplishing a feed by utilizing the second and third mentioned pump for supplying fluid to said means under a high constant pressure and for simultaneously utilizing said third mentioned pump for permitting return of fluid from said means at a volumetrically constant rate.

10. A machine tool combining a forwardly and reversely rotatable cutter spindle; a table; a hydraulic reciprocator for said table; a source of fluid under pressure; a valve intervening between said source and said reciprocator for determining the direction and rate of action of said reciprocator; and means adapted to be operated in timed relation with said valve for reversing the direction of rotation of the spindle simultaneously with the reversal of the direction of translation of said table.

11. A machine tool combining a hydraulic motor; a carrier propelled thereby; a low pressure high capacity pump; a high pressure metering pump; a valve casing having ports leading to and from said motor, having ports leading to and from said low pressure high capacity pump, and having ports leading to and from said high pressure metering pump; valve means in said casing adapted in one position to connect said first and second ports and to bridge together the third ports, in a succeeding position to bridge said second ports and to connect said first and third ports, in a succeeding position to connect reversely said first and second ports and to bridge said third ports, and in a succeeding position to bridge said second ports and to connect reversely said first and third ports; and means operated automatically by said carrier for shifting said valve means into said positions consecutively.

12. A machine tool combining a table; a hydraulic reciprocator therefor; a source of high and low pressure fluid; a single trip unit mounted adjacent said table and adapted to be oscillated or translated; and valve means actuated thereby and effective when said trip element is translated to effect changes in rate but not in direction, and when said trip element is oscillated to effect changes both in rate and direction to enable said trip element automatically to impart a reciprocating feed cycle to said table.

13. A machine tool combining a work support and a tool support; a hydraulic motor for propelling one of said supports; a constantly driven small capacity high pressure pump affording fluid pressure to actuate said hydraulic motor; a metering escapement pump; and a valve system intervening between said motor and said pumps, and adapted to accomplish a feeding of said propelled support by causing said metering pump to withdraw oil at a volumetrically uniform rate from said motor.

14. A machine tool combining a rotary cutter spindle; a support for said spindle and a support for work; a hydraulic pressure line; hydraulically actuated means receiving oil from said line for propelling one of said supports; mechanical means including a clutch for rotating said spindle; a valve controlling the flow of oil to and from said hydraulically actuated means; trip mechanism for actuating said valve; and hydraulically actuated means controlled by said valve for actuating the clutch to discontinue the rotation of the spindle when said valve is shifted to discontinue translation of said propelled support.

15. A machine tool combining a work support and tool support; three constantly driven pumps, one being a large capacity low pressure pump, another being a small capacity high pressure pump, and the third being a variable escapement pump; hydraulically actuated means for propelling one of said supports; a valve system intervening between said means and said three pumps for accomplishing a rapid traverse by utilizing only the first mentioned pump, or for accomplishing a feed by utilizing the second and third mentioned pumps for supplying fluid to said means under a high constant pressure, and for simultaneously utilizing said third mentioned pump for permitting return of fluid from said means at a volumetrically constant rate; and a trip mechanism automatically operated by said propelled support for regulating said valve system to perform its functions in a predetermined cycle.

16. A machine tool combining work and cutter supports; a hydraulic actuator for one of said supports; a source of high constant pressure oil; a copious source of low pressure oil; a continuously running escapement device for passing oil at selective volumetrically uniform rates; a main valve; means automatically operated by the propelled support for cyclicly shifting said main valve to cause said hydraulic actuator to propel its carrier at rapid traverse and feeding rates and to reverse the direction of propulsion; an auxiliary valve for arresting all flow of oil from said sources to said hydraulic actuator; and an automatic trip mechanism actuated by the propelled support for cyclicly actuating said valves.

17. A machine tool combining a rotating spindle; a work-table; a hydraulic propeller; a main valve for determining the action of said hydraulic propeller; an auxiliary valve constantly urged in one direction by a spring and normally adapted to be hydraulically shifted against said urge; means controlled by said valve for discontinuing the rotation of said spindle; a conduit communicating with said main valve; and a branch to said auxiliary valve to maintain it under normal pressure and to permit it to be shifted by said spring upon a drop in pressure.

18. A machine tool combining a translatable member; a hydraulic motor connected to translate said member; a reservoir; a constant delivery high pressure pump and suitable conduits for removing oil from said reservoir and forcing it into one end of said motor to build up therein a relatively high hydraulic forward pressure; and means connected with the discharging side of said motor to limit the exhaust therefrom under the influence of said high forward pressure to a volumetrically uniform rate.

19. A machine tool combining a translatable member; a hydraulic motor connected to translate said member; a hydraulic system connected to actuate said motor, said system including a reservoir; a constant delivery high pressure pump and suitable conduits for removing oil from said reservoir and forcing it into one end of said hydraulic motor; and a metering escapement device connected with the other end of said hydraulic motor and permitting the escape of oil therefrom only at a volumetrically uniform rate regardless of the amount of pressure in the other end of said motor.

20. A machine tool combining a translatable member; a hydraulic motor connected to translate said member; a normally filled hydraulic system connected to actuate said motor, said system including a reservoir; a constant delivery high pressure pump receiving oil from said reservoir and exhausting it into the intake end of said motor to produce therein a working pressure; and a pump connected to the exhaust end of said hydraulic motor and serving to receive and restrict the exhaust therefrom to a volumetrically uniform rate.

21. A machine tool combining a translatable member; a hydraulic motor connected to translate said motor; a normally filled hydraulic system connected to actuate said motor, said system including a reservoir; a constant delivery high pressure pump of low capacity receiving oil from said reservoir and exhausting it into the intake end of said hydraulic motor; a metering pump, adapted to pass oil at a volumetrically uniform rate, having its intake connected with the exhaust end of said hydraulic motor and its exhaust connected with the intake end of said motor, the exhaust of said high pressure pump combining with the exhaust of said metering pump to build up a high working pressure in the intake end of said motor and to maintain the system filled with oil.

22. A machine tool combining a translatable member; a hydraulic motor connected to translate said member; a hydraulic system connected to actuate said motor, said system including a reservoir; a high pressure pump having its intake connected with said reservoir and its exhaust connected with the intake end of said motor; a metering pump having its intake connected with the exhaust end of said hydraulic motor and its exhaust connected with intake end of the motor, said metering pump serving to limit the exhaust of oil from said hydraulic motor at a volumetrically uniform rate and to transmit it into the intake end of said motor; a by-pass line connecting said high pressure pump with said reservoir; a high pressure relief valve embodied therein, said by-pass serving to limit the pressure in the intake end of said motor and to return to the reservoir the excess oil passed by said high pressure pump; and means to vary the volumetrically uniform rate at which said metering pump passes oil.

23. In a machine tool transmission and control mechanism the combination of a plurality of members each shiftable to alter the effect of said transmission, a plurality of fluid operable shifting devices respectively for different of said members, an expansible chamber containing fluid under substantial pressure, a plurality of channels respectively for connecting said chamber with different of said devices, valve means for controlling fluid delivery from said chamber selectively to the one or the other of said channels, a reservoir of fluid, a power operated pump adapted to supply fluid from said reservoir to said chamber, and means controlling the delivery of fluid from said pump in accordance with the volume of fluid in said chamber.

24. In a machine tool the combination of a movable member, a source of power, a train connectible from said source to said member and including an element shiftable to alter the effect of said train, a fluid operable device for shifting said element, a train connectible from said source to said device and including means for accumulating a volume of fluid under substantial pressure, and means associated with the last mentioned train and controlling the connection thereof in accordance with the volume of fluid within said accumulating means.

25. In a milling machine the combination of a rotatable tool spindle, a work table reciprocable in a path transverse to the axis of said spindle, a spindle train including a power source and a shiftable motion interrupting clutch, a table transmission driven from said power source and operable for changing the rate of table movement, control means operable for effecting said change of rate of table movement, a fluid operable device for shifting said clutch, a fluid supply source, and valve means operative to supply fluid from said source to said device in accordance with the operation of said control means.

26. A machine tool combining a rotary cutter spindle; a support for said spindle and a support for work; hydraulic means for propelling one of said supports; mechanical means for rotating said spindle; valve means for controlling said hydraulic means thereby to give said propelled supports movements in opposite directions and at a plurality of rates; trip mechanism for actuating said valve means; a clutch embodied in said spindle rotating means for starting and stopping the rotation of said spindle; and an interlock between said trip mechanism and said clutch whereby said spindle will be caused to be rotated whenever the propelled support is in motion.

27. A milling machine having a support, a table reciprocably mounted thereon, a cutter rotatably mounted adjacent thereto, hydraulic means for reciprocating the table, a valve control for said means for determining both the rate and direction of movement of the table, an hydraulically actuated starting clutch for the cutter, and means in the valve for controlling the actuation of the clutch in accordance with the rate of movement of the table.

28. A machine tool combining a work support and a tool support; a prime mover; three pumps constantly driven thereby, one being a large capacity low pressure pump, the other being a small capacity high pressure pump, and the third being a variable escapement pump; hydraulic means for propelling one of said supports; and a valve system intervening between said means and said three pumps for accomplishing a rapid traverse by utilizing only the first mentioned pump, or for accomplishing a feed by utilizing the second and third mentioned pump for supplying fluid to said means under a high constant pressure and for simultaneously utilizing said third mentioned pump for permitting return of fluid from said means at a volumetrically constant rate.

29. A machine tool combining a work support and a tool support; a hydraulic motor for propelling one of said supports; a prime mover; three pumps constantly driven thereby, one being the large capacity low pressure pump, the other being a small capacity high pressure pump, and the third being a metering escapement pump, one of said pumps being adapted to inject oil into the intake end of said motor; and a valve system intervening between said motor and said pumps, and adapted to accomplish a feeding of said propelled support by causing said metering pump to withdraw oil at a volumetrically uniform rate from the exhaust end of said motor.

30. A machine tool combining a work support and a tool support; a prime mover; three pumps constantly driven thereby, one being a large capacity low pressure pump, the other being a small capacity high pressure pump, and the third being a variable escapement pump; hydraulic means for propelling one of said supports; a valve system intervening between said means and said three pumps for accomplishing a rapid traverse by utilizing only the first mentioned pump, or for accomplishing a feed by utilizing the second and third mentioned pumps for supplying fluid to said means under a high constant pressure, and for simultaneously utilizing said third mentioned pump for permitting return of fluid from said means at a volumetrically constant rate; and a trip mechanism automatically operated by said propelled support for regulating said valve system to perform its functions in a predetermined cycle.

31. A machine tool combining a reciprocable work table; hydraulic means to feed said table, said means including a cylinder, a piston therein, one of which is connected with the table, and means to admit fluid pressure into one end of said cylinder to effect relative movement between the cylinder and piston; variable escapement means connected with the exhaust end of the cylinder positively to limit the rate of exhaust thereby to determine the rate of feed of said table; and manually actuated means for controlling the escapement means thereby to vary at will the rate of table feed.

32. A milling machine combining a base; a table translatably mounted thereon; a reservoir formed in said base; hydraulic means to propel said table on said base, said means comprising a hydraulic motor connected with said table; a pump unit embodied in said base and comprising a rapid traverse pump, a feed pump and a feed rate control pump; hydraulic conduits connecting said pumps with said reservoir and said motor; a valve mechanism located in said base and embodied in said system to control the flow of fluid from said pumps to said motor; means to actuate said pumps; and means actuated by the movement of said table to shift said valve means to cause it to produce a predetermined cycle of movement of said table.

33. A milling machine combining a main frame; a work support thereon; a rotatable cutter support carried by said frame and drive means therefor, one of said supports being reciprocable relative to the other; hydraulic propelling means for effecting said reciprocation; valve control means for determining the rate and direction of said reciprocation; clutch means for said cutter support drive means; hydraulic means for actuating said clutch means; and means for controlling said hydraulic clutch means from said valve means and for thereby operating said clutch means concurrently with the movement of the reciprocable support.

34. A machine tool combining a main frame; a work support; a rotatable tool support; hydraulic power means for translating one of said supports relative to the other; valve means for controlling the movement and the starting and stopping of said translation; driving connections for rotating said tool support; clutch means for rendering said driving connections effective or ineffective; and hydraulic means controlled from said valve control means for operating said clutch means to stop and start the rotation of said tool support concurrently with the stopping and starting of said translatory movement.

35. A machine tool combining a translatable member; an hydraulic motor connected to translate said member; and a normally filled hydraulic system connected to actuate and control the movement of said motor including a metering escapement device adapted to be connected to receive and restrict the exhaust from said motor for permitting the escape of hydraulic fluid only at a volumetrically uniform rate, and hydraulic pump means adapted to be connected to the supply side of said motor and to pump hydraulic fluid thereto at high pressure and at a rate in excess of the capacity of said motor as determined by said escapement device.

36. A machine tool combining a translatable member; and a normally filled hydraulic system connected to translate said member including a hydraulic motor connected to said translatable member, a positive metering pump connected to receive the entire exhaust of said motor and to thereby measure the escape of hydraulic fluid at a uniform rate; and hydraulic pump means connected to the supply side of said motor, said hydraulic pump means being of a capacity to pump hydraulic fluid to said motor at a high pressure and at a rate in excess of the capacity of said motor to receive hydraulic fluid as determined by said metering pump.

37. A machine tool combining a translatable member; and a normally filled hydraulic system for translating said member including an hydraulic motor connected thereto, a metering escapement device connected to the exhaust of said motor by a closed conduit means and permitting the escape of oil from the exhaust only at a volumetrically uniform rate, a positive source of hydraulic fluid connected to the supply end of said hydraulic motor of a capacity to supply continuously hydraulic fluid under pressure and in excess of the capacity of said motor to receive oil as determined by said escapement device, and an auxiliary outlet in the supply line for releasing hydraulic fluid in excess of the said capacity of the motor while maintaining the supply side filled with oil under pressure.

38. A machine tool combining a translatable member; an hydraulic motor for translating said member; a metering pump adapted to be connected to the outlet of said motor by a normally closed conduit means to restrict the exhaust from said motor to a volumetrically uniform rate; pump means and suitable conduit means for directing hydraulic fluid under pressure to the forward supply end of said motor at a rate in excess of the capacity of said motor to receive fluid as determined by said metering pump; and a relief valve in said forward supply conduit means for by-passing the excess hydraulic fluid while maintaining said conduit means and forward end of the motor filled with hydraulic fluid during advancing movement.

39. A machine tool combining a translatable member; an hydraulic motor connected to translate said member; and a normally filled hydraulic system connected to operate said motor including a positive metering escapement device connected to receive and restrict the exhaust from said motor to a uniform rate, hydraulic pump means connected to the supply side of said motor and adapted to supply hydraulic fluid thereto under pressure and at a rate in excess of the capacity of said motor as determined by said escapement device, and means for selectively adjusting the rate of said metering escapement device to selectively determine the rate of translation.

40. In combination with a machine having a movable member means for moving said member including pressure mechanism for moving said member in an operative direction, and an inelastic fluid mechanism for opposing such movement, said last mentioned mechanism including means for regulating the rate of flow of the inelastic fluid independently of its pressure to thereby regulate the rate of movement of said member.

41. A moving and controlling mechanism for a machine tool slide comprising means for effecting movement of said slide in operative direction, said mechanism including inelastic fluid pressure mechanism for opposing such movement, said mechanism comprising cooperating parts consisting of a cylinder for containing such inelastic fluid and a piston in said cylinder, one of said parts being fixed and the other of said parts being operatively connected to said tool slide, a fluid metering device, and means for controlling the escape of inelastic fluid from said cylinder in response to pressure exerted thereon by said piston during operative movement of said slide selectively through or by-passing said metering device.

42. Moving and controlling mechanism for a tool slide or the like which comprises parts consisting of a cylinder and a piston in said cylinder, one of said parts being fixed and the other operatively connected to said slide, a reservoir, means for selectively admitting fluid pressure into said cylinder at one side of said piston to cause operative motion of said slide or into said reservoir, connections from said reservoir to the opposite side of said piston in said cylinder, said connections including a fluid metering device and a by-pass about said device, an inelastic fluid in said cylinder and in said connections, and means for selectively controlling the flow of inelastic fluid between said cylinder and said reservoir through said device or through said by-pass.

HANS ERNST.

CERTIFICATE OF CORRECTION.

Patent No. 2,036,206.  April 7, 1936.

HANS ERNST.

It is hereby certified that error appears in the printed specification of the above numbered patent requiring correction as follows: Page 5, first column, line 43, claim 1, strike out the word "both" and insert the same after "of", line 42, same claim; and line 60, claim 3, for "pressure" read pressures; and that the said Letters Patent should be read with these corrections therein that the same may conform to the record of the case in the Patent Office.

Signed and sealed this 19th day of May, A. D. 1936.

Leslie Frazer (Seal)  Acting Commissioner of Patents.

rection, said mechanism including inelastic fluid pressure mechanism for opposing such movement, said mechanism comprising cooperating parts consisting of a cylinder for containing such inelastic fluid and a piston in said cylinder, one of said parts being fixed and the other of said parts being operatively connected to said tool slide, a fluid metering device, and means for controlling the escape of inelastic fluid from said cylinder in response to pressure exerted thereon by said piston during operative movement of said slide selectively through or by-passing said metering device.

42. Moving and controlling mechanism for a tool slide or the like which comprises parts consisting of a cylinder and a piston in said cylinder, one of said parts being fixed and the other operatively connected to said slide, a reservoir, means for selectively admitting fluid pressure into said cylinder at one side of said piston to cause operative motion of said slide or into said reservoir, connections from said reservoir to the opposite side of said piston in said cylinder, said connections including a fluid metering device and a by-pass about said device, an inelastic fluid in said cylinder and in said connections, and means for selectively controlling the flow of inelastic fluid between said cylinder and said reservoir through said device or through said by-pass.

HANS ERNST.

CERTIFICATE OF CORRECTION.

Patent No. 2,036,206.    April 7, 1936.

HANS ERNST.

It is hereby certified that error appears in the printed specification of the above numbered patent requiring correction as follows: Page 5, first column, line 43, claim 1, strike out the word "both" and insert the same after "of", line 42, same claim; and line 60, claim 3, for "pressure" read pressures; and that the said Letters Patent should be read with these corrections therein that the same may conform to the record of the case in the Patent Office.

Signed and sealed this 19th day of May, A. D. 1936.

Leslie Frazer (Seal)    Acting Commissioner of Patents.

CERTIFICATE OF CORRECTION.

Patent No. 2,036,206.  April 7, 1936.

HANS ERNST.

It is hereby certified that error appears in the printed specification of the above numbered patent requiring correction as follows: Page 5, first column, line 43, claim 1, strike out the word "both" and insert the same after "of", line 42, same claim; and line 60, claim 3, for "pressure" read pressures; and that the said Letters Patent should be read with these corrections therein that the same may conform to the record of the case in the Patent Office.

Signed and sealed this 19th day of May, A. D. 1936.

Leslie Frazer (Seal)  Acting Commissioner of Patents.